(12) United States Patent
Nakai

(10) Patent No.: US 10,596,983 B2
(45) Date of Patent: Mar. 24, 2020

(54) WIRE HARNESS

(71) Applicant: SUMITOMO WIRING SYSTEMS, LTD., Yokkaichi-shi, Mie (JP)

(72) Inventor: Hirokazu Nakai, Yokkaichi (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 16/091,469

(22) PCT Filed: Apr. 3, 2017

(86) PCT No.: PCT/JP2017/013905
§ 371 (c)(1),
(2) Date: Oct. 4, 2018

(87) PCT Pub. No.: WO2017/175700
PCT Pub. Date: Oct. 12, 2017

(65) Prior Publication Data
US 2019/0126861 A1    May 2, 2019

(30) Foreign Application Priority Data
Apr. 7, 2016   (JP) .................................. 2016-077091

(51) Int. Cl.
*B60R 16/02* (2006.01)
*H02G 3/04* (2006.01)
(Continued)

(52) U.S. Cl.
CPC ........ *B60R 16/0215* (2013.01); *B60R 16/033* (2013.01); *H01B 7/0045* (2013.01);
(Continued)

(58) Field of Classification Search
CPC combination set(s) only.
See application file for complete search history.

(56) References Cited

U.S. PATENT DOCUMENTS

| 2,991,328 A | * | 7/1961 | Lay | ...................... H01B 7/0045 |
| | | | | 174/72 A |
| 3,013,108 A | * | 12/1961 | Sweeney | .................. H01B 9/06 |
| | | | | 174/99 R |

(Continued)

FOREIGN PATENT DOCUMENTS

| JP | H06-013328 U | 2/1994 |
| JP | 2013-243900 A | 12/2013 |
| JP | 2016-9538 A | 1/2016 |

OTHER PUBLICATIONS

May 9, 2017 International Search Report issued in International Patent Application No. PCT/JP2017/013905.

*Primary Examiner* — William H. Mayo, III
*Assistant Examiner* — Krystal Robinson
(74) *Attorney, Agent, or Firm* — Oliff PLC

(57) ABSTRACT

Provided is a wire harness capable of maintaining a predetermined bent shape. The wire harness has a conductor, an outer member that encloses the conductor, a rigid conductor portion that is included in the conductor and that has rigidity and is capable of retaining a bent shape, and a rigid outer portion that is included in the outer member and that has rigidity and is capable of retaining a bent shape, with the rigid conductor portion being arranged on the inner side of the rigid outer portion, and a bent portion being formed by the rigid outer portion and the rigid conductor portion together having undergone a bending process.

6 Claims, 3 Drawing Sheets

(51) Int. Cl.
  *B60R 16/033* (2006.01)
  *H01B 7/00* (2006.01)
  *H01B 13/012* (2006.01)

(52) U.S. Cl.
  CPC ......... *H01B 13/01209* (2013.01); *H02G 3/04* (2013.01); *H02G 3/0481* (2013.01)

(56) References Cited

U.S. PATENT DOCUMENTS

| | | | | |
|---|---|---|---|---|
| 4,531,807 A * | 7/1985 | Trigon | ............... | H01R 13/5213 439/866 |
| 4,665,280 A * | 5/1987 | Bowen | ............... | H02G 3/06 174/71 R |
| 4,815,814 A * | 3/1989 | Ulijasz | ............... | G02B 6/245 174/71 R |
| 5,448,017 A * | 9/1995 | Nakajima | ............ | B60R 16/0215 174/152 G |
| 7,053,305 B2 * | 5/2006 | Takase | ............... | B60R 16/0215 174/135 |
| 7,943,854 B1 * | 5/2011 | Lipp | ............... | H02G 3/0468 16/2.1 |
| 2002/0031322 A1 * | 3/2002 | Asada | ............... | G02B 6/4459 385/134 |
| 2002/0179318 A1 * | 12/2002 | Seo | ............... | B60R 16/0215 174/71 R |
| 2003/0222183 A1 * | 12/2003 | Kato | ............... | B60R 16/0215 248/49 |
| 2005/0011687 A1 * | 1/2005 | Yamaguchi | ............... | B60K 6/48 180/65.1 |
| 2008/0142260 A1 * | 6/2008 | Yamaguchi | ............ | B60N 2/0224 174/72 A |
| 2009/0084578 A1 * | 4/2009 | Irisawa | ............... | B60R 16/0215 174/135 |
| 2009/0294149 A1 * | 12/2009 | Watanabe | ............... | H01B 7/16 174/102 R |
| 2010/0258686 A1 * | 10/2010 | Sutton | ............... | H02G 3/0406 248/73 |
| 2012/0125683 A1 * | 5/2012 | Mabuchi | ............ | B60R 16/0215 174/72 A |
| 2013/0105218 A1 * | 5/2013 | Kuboshima | ............ | B60R 16/0215 174/72 A |
| 2013/0180776 A1 * | 7/2013 | Gotou | ............... | B60R 16/0215 174/70 C |
| 2014/0083031 A1 * | 3/2014 | Dunlop | ............... | E04C 5/16 52/223.14 |
| 2017/0148546 A1 | 5/2017 | Nakai | | |

* cited by examiner

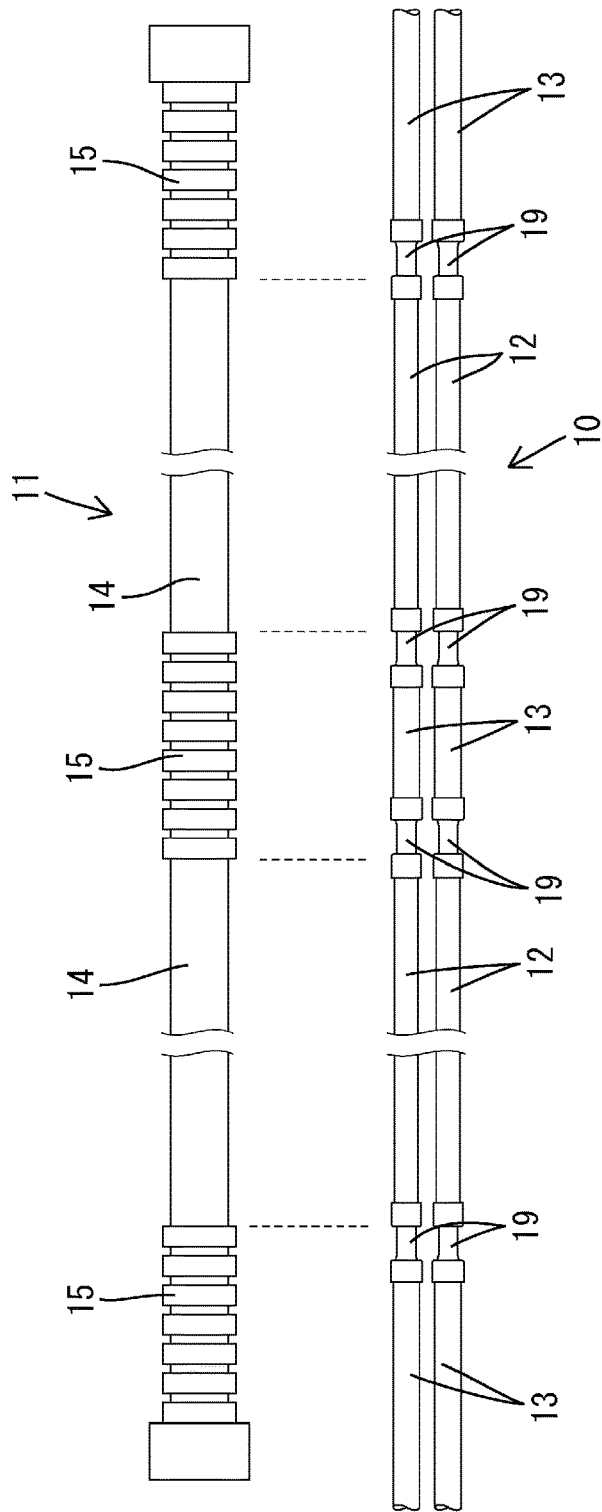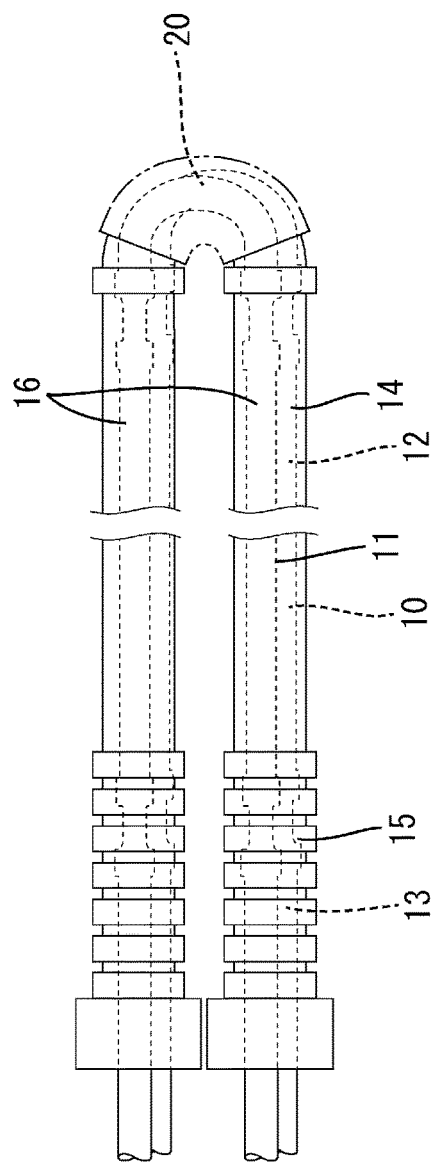
FIG. 4A
FIG. 4B

WIRE HARNESS

TECHNICAL FIELD

The present disclosure relates to a wire harness.

BACKGROUND ART

Conventionally, wire harnesses provided with one or a plurality of electrical wires are known. The electrical wires are protected by being inserted into an outer member such as a corrugated tube, and are fixed to the vehicle body by fixing clamps or the like. Since the corrugated tube has flexibility, there is concern about the wire harness hanging down between the fixing clamps under its own weight. In view of this, outer members having a straight tube portion and a concertina/accordion portion are known, as described in the following Patent Document 1, for example. The wire is prevented from hanging down because of the straight tube portion maintaining a linear shape, and the wire harness can be formed to follow a predetermined routing path by bending the concertina/accordian portion at a predetermined angle.

CITATION LIST

Patent Documents

Patent Document 1: JP 2013-243900A

SUMMARY

Technical Problem

However, with the above configuration, because the concertina/accordian portion of the outer member is flexibly bent, the bent shape of the wire harness cannot be maintained. Thus, when attaching the wire harness, for example, this task needs to be carried out while bending the concertina/accordian portion into a predetermined shape and retaining the shape, which takes time and effort.

The present invention was completed based on the above circumstances, and an object thereof is to provide a wire harness capable of maintaining a predetermined bent shape.

Solution to Problem

A wire harness of the present invention includes a conductor, an outer member that is made of a synthetic resin and encloses the conductor, a rigid conducting portion that is included in the conductor and that has rigidity and is capable of retaining a bent shape, a rigid outer portion that is included in the outer member and that has rigidity and is capable of retaining a bent shape, and a flexible outer portion that is included in the outer member integrally with the rigid outer portion and has flexibility, the rigid conducting portion being arranged on an inner side of the rigid outer portion, and a bent portion being formed by the rigid outer portion and the rigid conducting portion together having undergone a bending process.

Advantageous Effects

According to aspects of some preferred embodiments, although spring back acts to cause the rigid outer portion that was subjected to the bending process to return slightly to its original shape, the shape is retained by the rigid conductor portion of the conductor that was together subjected to the bending process, and thus the wire harness is able to maintain the predetermined bent shape.

BRIEF DESCRIPTION OF DRAWINGS

FIG. 4 show a wire harness in a second embodiment, with (A) being a side view showing an outer member and conductors, and (B) being a side view showing the wire harness in a state where a flexible portion is folded.

DESCRIPTION OF EMBODIMENTS

Preferred embodiments will be illustrated below.

A wire harness of some preferred embodiments may be configured such that, in the rigid outer portion, at least an inner peripheral surface of the portion subjected to the bending process protrudes more inwardly than other portions. According to such configuration, the internal space of the rigid outer portion narrows at the bent portion of the wire harness, and thus a situation in which the bent portion of the rigid outer portion collapses into the space and flattens out, causing cracking or the like to occur in the outer member at the bent portion, can be prevented.

Also, the wire harness of some preferred embodiments may be configured such that the conductor has a flexible conducting portion that has flexibility and a flexible portion formed by arranging the flexible conducting portion on the inner side of the flexible outer portion is provided in a region excluding the bent portion. According to such a configuration, the wire harness can be folded at the flexible portion and transported while maintaining the bent shape of the wire harness, thus enabling excellent product packability.

First Embodiment

Figure 1:
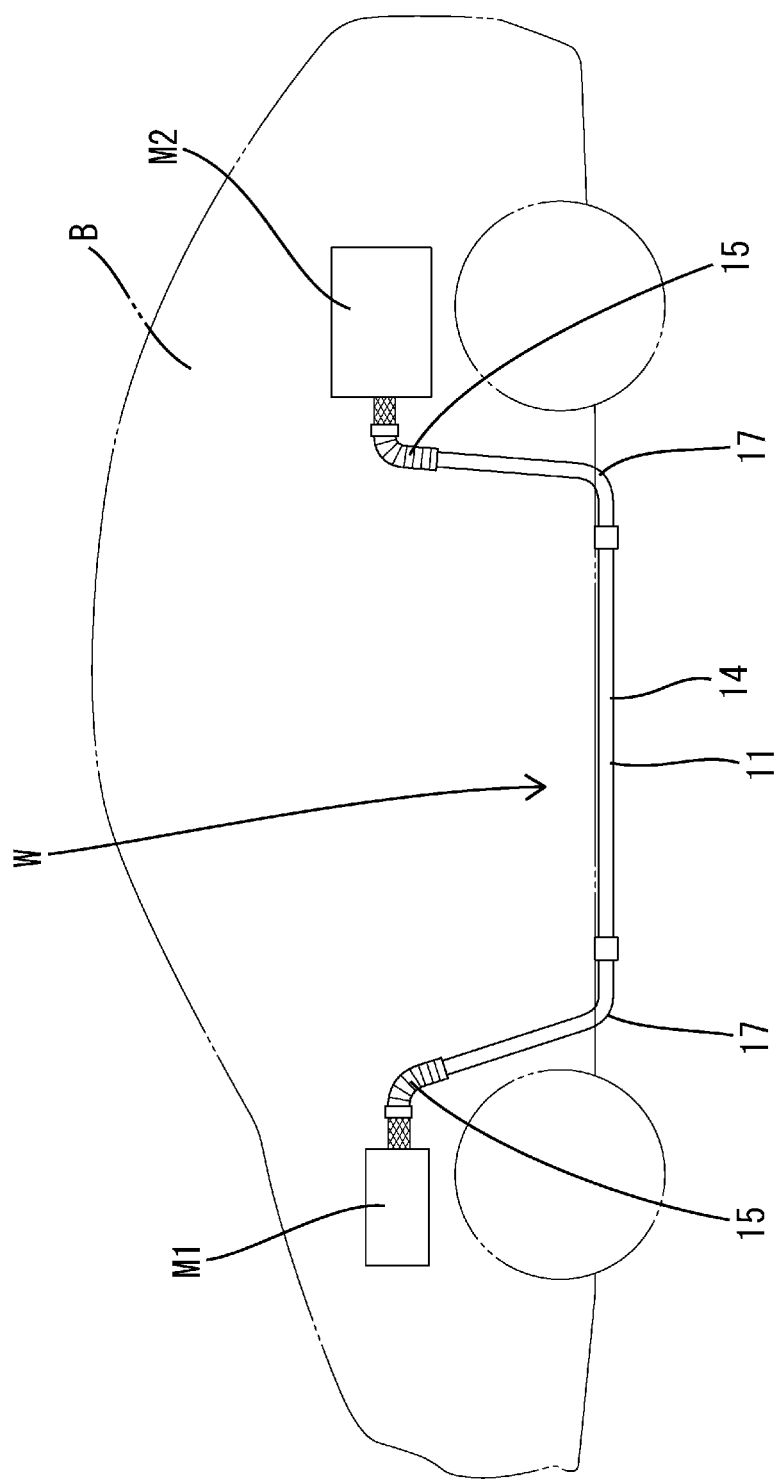
FIG. 1 is a schematic view showing a wire harness in a first embodiment in a state of being attached to a vehicle body.

Hereinafter, a first embodiment will be described in detail, with reference to FIGS. 1 to 3.

A wire harness W in the present embodiment is a low voltage harness that is installed in a vehicle, and is, for example, connected between a device M1 such as an auxiliary battery (12 V battery) disposed in a front portion of a vehicle body B and a device M2 such as a PDU (Power Drive Unit) disposed in a rear portion of the vehicle body B. The wire harness W is routed to extend under the floor of the vehicle body B in a front-back direction, and both front and back end portions are bent upward toward the vehicle interior.

The wire harness W has a plurality of conductors 10 (two in the present embodiment), and an outer member 11 that collectively encloses the plurality of conductors 10. The conductors 10 are insulated and protected by the outer member 11.

The conductors 10 have a rigid conductor portion 12 that has rigidity and is capable of retaining a bent shape, and a flexible conductor portion 13 that has flexibility (bendability) and is capable of being bent into any shape. The rigid conductor portion 12 is, as shown in FIG. 2, provided in an intermediate portion of the conductor 10 in the longitudinal direction, and is mainly disposed under the floor of the vehicle body B. The flexible conductor portion 13 is provided at both end portions of the conductor 10 in the longitudinal direction, and on end portions thereof are provided connectors (not shown) that are respectively connected to the devices M1 and M2. The rigid conductor portion 12 and the flexible conductor portion 13 are connected by any suitable connecting means such as crimping or ultrasonic deposition or welding.

The rigid conductor portion 12 is constituted by a pipe member having a circular cross-section. The pipe member is given as consisting of any metal material having excellent conductivity, such as aluminum, an aluminum alloy, copper or a copper alloy. The pipe member has a large second moment of area, and thus has excellent shape maintainability.

The flexible conductor portion 13 is given as a stranded electrical wire formed by covering a core wire that consists of a plurality of strands with an insulating coating. The core wire consists of any suitable metal material such as aluminum, an aluminum alloy, copper or a copper alloy. In a terminal portion of the stranded electrical wire, the insulating coating is stripped and the core wire is exposed. The exposed core wire is electrically connected to the pipe member by any suitable connecting means.

The outer member 11 is made of a synthetic resin, and has a rigid outer portion 14 that has rigidity and is capable of retaining a bent shape, and a flexible outer portion 15 that has flexibility (bendability) and is capable of being bent into any shape. The rigid outer portion 14 and the flexible outer portion 15 are integrally formed.

The rigid outer portion 14 is given as having a cylindrical shape whose cross-sectional shape is generally regular without unevenness, and as not having flexibility such as the flexible outer portion 15. The flexible outer portion 15 has a concertina/accordian shape in which ridge portions and valley portions are alternately arranged continuously in the axial direction.

Figure 2:
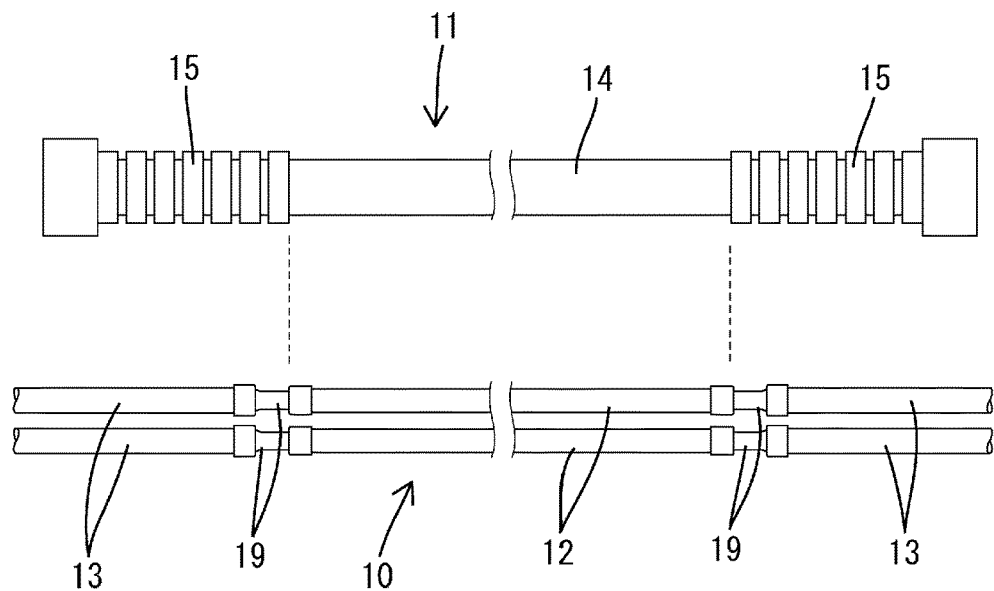
FIG. 2 is a side view showing an outer member and conductors.

The rigid outer portion 14, as shown in FIG. 2, is provided in an intermediate portion of the outer member 11 in the longitudinal direction, and is mainly disposed under the floor of the vehicle body B. The rigid outer portion 14 has an outer diameter dimension that is smaller than the outer diameter dimension of the flexible outer portion 15, and is suitable for routing under the floor. The flexible outer portion 15 is provided at both end portions of the outer member 11 in the longitudinal direction. The flexible outer portion 15 can be easily bent, and is thus suitable for carrying out the task of connecting the devices M1 and M2.

In the wire harness W, as shown in FIG. 2, the rigid conductor portion 12 is arranged on the inner side of the rigid outer portion 14, and the flexible conductor portion 13 is arranged on the inner side of the flexible outer portion 15. The rigid outer portion 14 and the rigid conductor portion 12 are given as having equivalent length dimensions, and the flexible outer portion 15 and the flexible conductor portion 13 are given as having equivalent length dimensions. That is, the full length of the rigid conductor portion 12 is enclosed by the rigid outer portion 14, and the full length of the flexible conductor portion 13 is enclosed by the flexible outer portion 15. A connecting portion 19 of the rigid conductor portion 12 and the flexible conductor portion 13 is arranged in a vicinity of the boundary between the rigid outer portion 14 and the flexible outer portion 15.

The wire harness W is formed in a shape that follows a predetermined routing path, as a result of a portion (henceforth, referred to as rigid body portion 16) formed by the rigid conductor portion 12 being arranged on the inner side of the rigid outer portion 14 undergoing a bending process into a predetermined shape. In a bent portion 17 of the rigid body portion 16, the rigid outer portion 14 and the rigid conductor portion 12 have together undergone the bending process.

Figure 3:
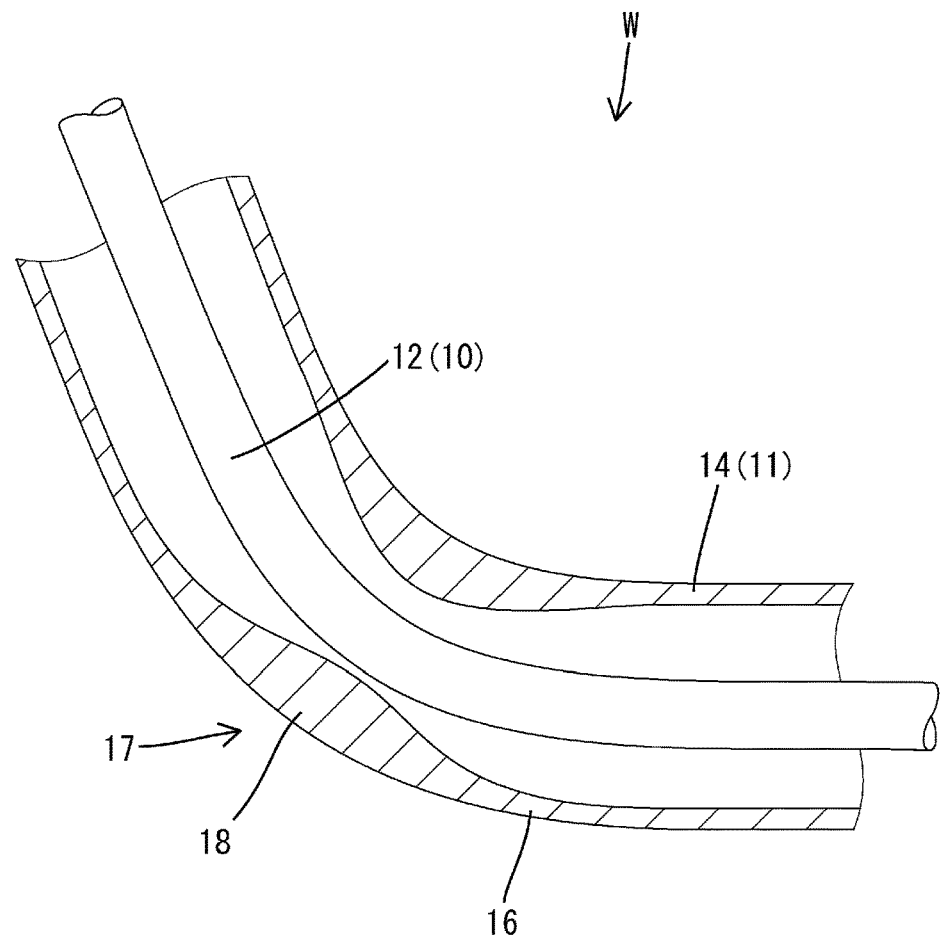
FIG. 3 is a partial enlarged cross-sectional view showing a bent portion of the wire harness.

In the rigid outer portion 14, the portion subjected to the bending process (henceforth, referred to as outer bent portion 18) has, as shown in FIG. 3, a greater thickness dimension than other portions. In the outer bent portion 18, the thickness dimension is increased on both the inner side and the outer side of the bend. The inner peripheral surface of the outer bent portion 18 thereby protrudes more inwardly than other portions, and a gap between the inner peripheral surface of the outer bent portion 18 and the outer peripheral surface of the conductors 10 is narrower than other portions. Note that this gap is desirably 3 mm or less.

Next, an example of a manufacturing method of the wire harness W will be described.

First, the conductors 10 are inserted into the outer member 11. The rigid conductor portion 12 is arranged to be on the inner side of the rigid outer portion 14 and the flexible conductor portion 13 is arranged to be on the inner side of the flexible outer portion 15.

Next, the bent portion 17 is formed. The rigid outer portion 14 together with the conductors 10 undergoes the bending process at a predetermined place. The rigid outer portion 14 and the rigid conductor portion 12 are bent into the same shape, and the bent portion 17 of the wire harness W is formed. Here, if the gap between the rigid outer portion and the rigid conductor portion is large, there is a risk that the bent portion of the rigid outer portion will collapse into the space and cracking will occur. However, because the inner space of the outer bent portion 18 is narrow, or in other words, because the inner space is filled up, a situation in which the bent portion collapses in such a manner can be prevented.

Manufacture of the wire harness W is thereby completed.

Next, the operation and effect of the embodiment constituted as illustrated above will be described.

The wire harness W of the present embodiment has the conductors 10 and the outer member 11 that encloses the conductors 10, with the rigid conductor portion 12 that has rigidity and is capable of retaining a bent shape being included in the conductors 10, the rigid outer portion 14 that has rigidity and is capable of retaining a bent shape being included in the outer member 11, the rigid conductor portion 12 being arranged on the inner side of the rigid outer portion 14, and the bent portion 17 being formed by the rigid outer portion 14 and the rigid conductor portion 12 together having undergone the bending process.

According to this configuration, although spring back acts to cause the rigid outer portion 14 that was subjected to the bending process to return slightly to its original shape, the shape is retained by the rigid conductor portion 12 of the conductors 10 that was together subjected to the bending process, and thus the wire harness W is able to maintain the predetermined bent shape.

Also, the inner peripheral surface of the outer bent portion 18 protrudes more inwardly than other portions. According to this configuration, the inner space of the outer bent portion 18 narrows in the bent portion 17 of the wire harness W, and thus a situation in which the outer bent portion 18 collapses into the space and flattens out, causing cracking or the like to occur in the outer bent portion 18, can be prevented, and insulating performance can be reliably secured.

Also, by increasing the thickness dimension of only the outer bent portion 18, difficulty in inserting the conductors 10 into the outer member 11 can be prevented.

Second Embodiment

Next, a wire harness W according to a second embodiment will be described with FIG. 4.

The wire harness W of the present embodiment differs from the first embodiment in that a flexible portion 20 formed by a flexible conductor portion 13 being arranged on the inner side of a flexible outer portion 15 is provided in a region excluding a bent portion 17. Note that configurations that are similar to the first embodiment are given the same reference signs and redundant description is omitted.

The wire harness W according to the present embodiment, similarly to the first embodiment, has conductors 10 and an outer member 11 that encloses the conductors 10, with a rigid conductor portion 12 that has rigidity and is capable of retaining a bent shape and a flexible conductor portion 13 that has flexibility being included in the conductors 10, a rigid outer portion 14 that has rigidity and is capable of retaining a bent shape and a flexible outer portion 15 that has flexibility being included in the outer member 11, the rigid conductor portion 12 being arranged on the inner side of the rigid outer portion 14, and a bent portion 17 being formed by the rigid outer portion 14 and the rigid conductor portion 12 together having undergone a bending process. Note that, in FIG. 4, illustration of the bent portion 17 is omitted.

The flexible portion 20 is provided in an intermediate portion (in the present embodiment, in the middle of the overall length) of the wire harness W. The flexible portion 20 is located in an intermediate portion of the rigid body portion 16, and the rigid body portion 16 is on both sides in the axial direction. The flexible portion 20 is provided in a position of the rigid body portion 16 excluding the bent portion 17. In the flexible portion 20, the flexible conductor portion 13 and the flexible outer portion 15 are given as having equivalent length dimensions.

The wire harness W, which is, similarly to the first embodiment, manufactured by forming the bent portion 17 after inserting the conductors 10 into the outer member 11, can be made more compact by being folded in two at the flexible portion 20, as shown in FIG. 4(B) to enable packaging and transportation.

In the present embodiment as described above, similarly to the first embodiment, the rigid conductor portion 12 is arranged on the inner side of the rigid outer portion 14, and the bent portion 17 is formed by the rigid outer portion 14 and the rigid conductor portion 12 together having undergone the bending process, and thus the shape of the rigid outer portion 14 is retained by the rigid conductor portion 12 of the conductors 10, enabling the wire harness W to maintain a predetermined bent shape. Furthermore, because the flexible portion 20 formed by the flexible conductor portion 13 being arranged on the inner side of the flexible outer portion 15 is provided in a region excluding the bent portion 17, the wire harness W can be folded at the flexible portion 20 and transported while maintaining the bent shape of the wire harness, thus enabling excellent product packability.

Other Embodiments

The present invention is not limited to the embodiments illustrated with the above description and drawings, and embodiments such as the following, for example, are also encompassed in the technical scope of the invention.

(1) In the above embodiments, the case where the wire harness W is a low voltage harness was described, but the present invention is not limited thereto, and can also be applied to a high voltage harness.

(2) In the above embodiments, the wire harness W has two conductors 10, but the present invention is not limited thereto, and there may be one or three or more conductors.

(3) In the above embodiments, the rigid conductor portion 12 is constituted by a pipe member, but the present invention is not limited thereto, and the rigid conductor portion may be any suitable member, such as, for example, the rigid conductor portion being a single core electrical wire formed by a metal rode-like core wire being enclosed with an insulating coating.

(4) In the above embodiments, the flexible conductor portion 13 is given as a stranded electrical wire, but the present invention is not limited thereto, and the flexible conductor portion 13 may be any suitable member, such as, for example, the flexible conductor portion being a braided wire formed by braiding metal strands having excellent conductivity.

(5) In the above embodiments, the flexible outer portion 15 is given as having a concertina/accordian shape, but the present invention is not limited thereto, and the flexible outer portion may be any shape as long as it has flexibility.

(6) In the above embodiments, the rigid outer portion 14 has a cylindrical shape whose cross-sectional shape is generally regular without unevenness, but the present invention is not limited thereto, and the rigid outer portion need only have a predetermined rigidity, such as a protruding rib or the like, for example.

(7) In the above embodiments, the rigid outer portion 14 and the flexible outer portion 15 are integrally formed, but the present invention is not limited thereto, and the rigid outer portion and the flexible outer portion may be separate portions that are divided.

(8) In the above embodiments, the rigid conductor portion 12 is arranged along the full length of the rigid outer portion 14, but the present invention is not limited thereto, and the rigid conductor portion need only be at least arranged in the outer bent portion of the rigid outer portion, and the flexible conductor portion may be arranged in a straight portion of the rigid outer portion that does not undergo the bending process, for example.

(9) In the above embodiments, only the outer bent portion 18 is given as being thick, but the present invention is not limited thereto, and the thickness dimension may be increased across other portions.

LIST OF REFERENCE NUMERALS

W Wire harness
10 Conductor
11 Outer member
12 Rigid conductor portion
13 Flexible conductor portion
14 Rigid outer portion
15 Flexible outer portion
17 Bent portion
18 Outer bent portion (portion of rigid outer portion subjected to bending process)
20 Flexible portion

The invention claimed is:

1. A wire harness comprising:
a conductor;
an outer member that is made of a synthetic resin and encloses the conductor;
flexible conducting portions that are included in the conductor along a length of the conductor;
a rigid conducting portion that is included in the conductor along the length of the conductor between the flexible conducting portions, and that has rigidity capable of retaining a bent shape;

a rigid outer portion that is included in the outer member, and that has rigidity capable of retaining a bent shape; and a flexible outer portion that is included in the outer member integrally with the rigid outer portion and is flexible compared to the rigid outer portion, wherein the rigid conducting portion is arranged on an inner side of the rigid outer portion, and a bent portion is formed by the rigid outer portion and the rigid conducting portion together having undergone a bending process.

2. The wire harness according to claim 1, wherein, in the rigid outer portion, an inner peripheral surface of at least the portion subjected to the bending process protrudes more inwardly than other portions.

3. The wire harness according to claim 2, wherein the conductor has a flexible conducting portion that is flexible compared to the rigid conducting portion, and a flexible portion formed by the flexible conducting portion being arranged on an inner side of the flexible outer portion is provided in a region excluding the bent portion.

4. A method of forming a wire harness comprising:

providing a conductor having flexible conducting portions that are included in the conductor along a length of the conductor and a rigid conducting portion along the length of the conductor between the flexible conducting portions, the rigid conducting portion having rigidity capable of retaining a bent shape;

providing an outer member that is made of a synthetic resin and oriented so as to enclose the conductor, the outer member integrally formed of a rigid outer portion and a flexible outer portion, wherein the rigid outer portion has rigidity capable of retaining a bent shape, the flexible outer portion is flexible compared to the rigid outer portion, the rigid conducting portion is arranged on an inner side of the rigid outer portion, and a bent portion is formed by the rigid outer portion and the rigid conducting portion together having undergone a bending process.

5. The wire harness according to claim 1, wherein the rigid outer portion is bendable and capable of retaining the bent shape.

6. The method according to claim 5, wherein the rigid outer portion is bendable and capable of retaining the bent shape.

* * * * *